United States Patent
Serra et al.

(10) Patent No.: US 9,002,622 B2
(45) Date of Patent: Apr. 7, 2015

(54) DEVICE AND METHOD FOR CONTROLLING FUEL INJECTION IN AN ENGINE DEPENDING ON THE EXHAUST GAS PARTIAL RECIRCULATION RATE

(75) Inventors: Bruno Serra, Etampes (FR); Sylvain Hourlier, Arpason (FR)

(73) Assignee: Renault SAS, Boulogne Billancourt (FR)

( * ) Notice: Subject to any disclaimer, the term of this patent is extended or adjusted under 35 U.S.C. 154(b) by 695 days.

(21) Appl. No.: 13/256,784

(22) PCT Filed: Mar. 15, 2010

(86) PCT No.: PCT/FR2010/050451
§ 371 (c)(1),
(2), (4) Date: Sep. 15, 2011

(87) PCT Pub. No.: WO2010/106273
PCT Pub. Date: Sep. 23, 2010

(65) Prior Publication Data
US 2012/0004834 A1      Jan. 5, 2012

(30) Foreign Application Priority Data
Mar. 19, 2009  (FR) ..................... 09 51756

(51) Int. Cl.
*B60T 7/12*      (2006.01)
*G05D 1/00*      (2006.01)
(Continued)

(52) U.S. Cl.
CPC ............. *F02D 41/182* (2013.01); *F02D 21/08* (2013.01); *F02D 41/0072* (2013.01);
(Continued)

(58) Field of Classification Search
CPC ............ F02D 41/0025; F02D 41/0047; F02D 41/0052; F02M 25/0707; F02M 25/0709; F02M 25/071
USPC .......... 701/103, 104, 108; 123/704, 445, 510, 123/568.11, 568.17
See application file for complete search history.

(56) References Cited

U.S. PATENT DOCUMENTS 3,745,768 A * 7/1973 Zechnall et al. ............. 123/676
5,946,906 A * 9/1999 Akazaki et al. ................ 60/278
(Continued)

FOREIGN PATENT DOCUMENTS

DE      197 30 403      10/1998
EP      0 974 747       1/2000
(Continued)

OTHER PUBLICATIONS

International Search Report Issued Jul. 27, 2010 in PCT/FR10/050451 Filed Mar. 15, 2010.

*Primary Examiner* — Hieu T Vo
*Assistant Examiner* — Sherman Manley
(74) *Attorney, Agent, or Firm* — Oblon, McClelland, Maier & Neustadt, L.L.P.

(57) ABSTRACT

A device for controlling fuel injection in an internal combustion engine of an automobile, the internal combustion engine being connected at an inlet thereof to a fresh air intake pipe and at an outlet thereof to an exhaust gas discharge pipe including a catalytic converter, an exhaust gas partial recirculation circuit connecting the discharge pipe to the fresh air intake pipe. The device includes a mechanism determining the amount of unburned fuel in the exhaust gases, a mechanism determining the amount of fresh air taken into the internal combustion engine, and an electronic controller determining the amount of fuel to be injected depending on signals received of the determined amount of unburned fuel and the determined amount of fresh air taken in.

7 Claims, 3 Drawing Sheets

(51) Int. Cl.
  *G06F 7/00* (2006.01)
  *G06F 17/00* (2006.01)
  *F02D 41/18* (2006.01)
  *F02D 21/08* (2006.01)
  *F02D 41/00* (2006.01)
  *F02D 41/40* (2006.01)
  *F02D 41/14* (2006.01)
  *F02M 25/07* (2006.01)

(52) U.S. Cl.
  CPC .......... *F02D 41/1454* (2013.01); *F02D 41/40* (2013.01); *F02D 2200/0616* (2013.01); *F02M 25/0707* (2013.01); *F02M 25/0709* (2013.01); *F02M 25/0718* (2013.01); *Y02T 10/44* (2013.01)

(56) References Cited

U.S. PATENT DOCUMENTS

| | | | |
|---|---|---|---|
| 6,138,650 A * | 10/2000 | Bailey | 123/568.12 |
| 6,141,959 A * | 11/2000 | Digeser et al. | 60/274 |
| 6,269,791 B1 * | 8/2001 | Tanaka et al. | 123/300 |
| 6,715,474 B1 * | 4/2004 | Sasaki et al. | 123/568.21 |
| 6,817,174 B1 * | 11/2004 | Igarashi et al. | 60/295 |
| 6,842,690 B2 * | 1/2005 | Akao et al. | 701/114 |
| 6,857,263 B2 * | 2/2005 | Gray et al. | 60/278 |
| 6,941,905 B2 * | 9/2005 | Hitomi et al. | 123/58.8 |
| 6,988,365 B2 * | 1/2006 | Sasaki | 60/605.2 |
| 7,043,914 B2 * | 5/2006 | Ishikawa | 60/605.2 |
| 7,380,400 B2 * | 6/2008 | Barbe et al. | 60/605.2 |
| 7,493,762 B2 * | 2/2009 | Barbe et al. | 60/605.2 |
| 7,621,128 B2 * | 11/2009 | Czarnowski et al. | 60/605.2 |
| 8,291,697 B2 * | 10/2012 | Matsumoto et al. | 60/295 |
| 8,359,839 B2 * | 1/2013 | Van Nieuwstadt et al. | 60/295 |
| 2005/0103014 A1 * | 5/2005 | Sasaki | 60/605.2 |
| 2005/0172613 A1 * | 8/2005 | Blomquist | 60/274 |
| 2007/0125075 A1 * | 6/2007 | Zanini-Fisher et al. | 60/297 |
| 2007/0157604 A1 * | 7/2007 | Kakuya et al. | 60/285 |
| 2010/0018187 A1 * | 1/2010 | Matsumoto et al. | 60/286 |
| 2013/0247883 A1 * | 9/2013 | Onishi et al. | 123/568.11 |

FOREIGN PATENT DOCUMENTS

| | | |
|---|---|---|
| EP | 1 132 597 | 9/2001 |
| FR | 2 844 306 | 3/2004 |
| WO | 2008 025921 | 3/2008 |

* cited by examiner

DEVICE AND METHOD FOR CONTROLLING FUEL INJECTION IN AN ENGINE DEPENDING ON THE EXHAUST GAS PARTIAL RECIRCULATION RATE

BACKGROUND

The technical field of the invention is the control of combustion in an internal combustion engine and more particularly the control of the fuel injection into an internal combustion engine provided with exhaust gas recirculation.

The standards relating to the emissions of pollutants are imposing an increasingly fine control on combustion and on the air intake circuit of the internal combustion engines, notably via the control of the exhaust gas partial recirculation circuit (EGR), and the various units situated upstream and downstream of the internal combustion engine. The emissions of pollutants are directly linked to the relative quantities of air and fuel taken into the internal combustion engine. The knowledge and the control of this parameter are thus important in order to reduce the emissions of pollutants.

The relative quantities of air and fuel taken into an internal combustion engine are characterized by the richness parameter. This parameter depends on the ratio between the mass of fuel and the mass of fresh air taken in.

In order to further reduce the consumption of fuel and the emissions of pollutants, an exhaust gas partial recirculation circuit is used, which alters the ratio between the fuel and the fresh air taken in. However, the value of the parameter obtained by calculation or measurement takes into account only the fresh air contributed by the intake circuit. The oxygen and unburned hydrocarbons contributed by the exhaust gas partial recirculation circuit are therefore disregarded.

The patent application FR 2 851 014 describes a calculation method that takes into account the fresh air coming from the exhaust gas partial recirculation circuit.

However, there is currently no determination device or method that makes it possible to take into account the contribution of unburned hydrocarbons by the exhaust gas partial recirculation circuit. Such a method would make it possible to determine the quantity of hydrocarbons brought by the exhaust gas partial recirculation circuit and accordingly reduce the quantity of fuel injected.

BRIEF SUMMARY

The object of the invention is to estimate the quantity of fuel injected by taking into account the quantity of unburned fuel taken into the internal combustion engine by the exhaust gas partial recirculation.

Another object of the invention is to estimate the quantity of neutral gases in the exhaust gases in order to optimally adjust the quantities of fuel injected and of fresh air taken in.

According to one aspect of the invention, there is defined a device for controlling the fuel intake of an internal combustion engine fitted in an automotive vehicle, said internal combustion engine being linked at its inlet to a fresh air intake pipe and at its outlet to an exhaust gas exhaust pipe, which is in turn linked to a catalytic converter, an exhaust gas partial recirculation circuit linking the exhaust pipe to the fresh air intake pipe. The device comprises a means for determining the quantity of unburned fuel in the exhaust gases, a means for determining the quantity of fresh air taken into the internal combustion engine, and an electronic control means capable of determining the quantity of fuel to be injected on the basis of the signals received from the means for determining the quantity of unburned fuel and from the means for determining the quantity of fresh air taken in.

The means for determining the quantity of unburned fuel in the exhaust gases may comprise a first probe situated upstream of the catalytic converter and a means for estimating the quantity of unburned fuel in the exhaust gases on the basis of the signals received from the first probe.

The means for determining the quantity of fresh air taken into the internal combustion engine may comprise a second probe situated upstream of the tapping point of the exhaust gas partial recirculation circuit on the fresh air intake pipe and a means for estimating the mass of fresh air taken in on the basis of the signals received from the second probe.

The electronic control means may comprise a means for estimating the proportion of neutral gases in the exhaust gases on the basis of the signals received from the means for estimating the mass of fresh air taken in, and a means for determining the quantity of fuel to be injected on the basis of the signals received from the means for estimating the quantity of unburned fuel in the exhaust gases, from the means for estimating the mass of fresh air taken in, and from the means for estimating the proportion of neutral gases.

The control device may also comprise an intake manifold, an exhaust manifold, and a turbocharger whose compressor is positioned between the fresh air intake pipe and the intake manifold, the turbine of the turbocharger being positioned between the exhaust pipe and the exhaust manifold, the exhaust gas partial recirculation circuit being linked on the one hand between the exhaust manifold and the turbocharger and on the other hand between the intake manifold and the turbocharger.

In another configuration, the control device may comprise an intake manifold, an exhaust manifold, and a turbocharger whose compressor is positioned between the fresh air intake pipe and the intake manifold, the turbine of the turbocharger being positioned between the exhaust pipe and the exhaust manifold, the exhaust gas partial recirculation circuit being linked on the one hand to the outlet of the catalytic converter and on the other hand upstream of the compressor of the turbocharger.

According to another aspect of the invention, there is defined a method for controlling the intake of fuel for an internal combustion engine fitted in an automotive vehicle, said internal combustion engine being linked at its inlet to a fresh air intake pipe and at its outlet to an exhaust gas exhaust pipe, which is in turn linked to a catalytic converter, an exhaust gas partial recirculation circuit linking the exhaust pipe to the fresh air intake pipe. The method comprises steps during which:

the quantity of unburned fuel in the exhaust gases upstream of the catalytic converter is determined, the quantity of fresh air taken into the internal combustion engine via the fresh air intake pipe is determined, and the quantity of fuel to be injected is determined on the basis of the quantity of unburned fuel in the exhaust gases and of the quantity of fresh air taken in.

The control method may also comprise steps during which:

the proportion of neutral gases in the exhaust gases is estimated on the basis of the mass of fresh air taken in, and the quantity of fuel to be injected is determined on the basis of the quantity of unburned fuel in the exhaust gases, the mass of air taken in and the proportion of neutral gases.

BRIEF DESCRIPTION OF THE DRAWINGS

Other aims, characteristics and advantages will become apparent from reading the following description, given solely as a non-limiting example, and with reference to the appended drawings in which.

DETAILED DESCRIPTION

Figure 1:
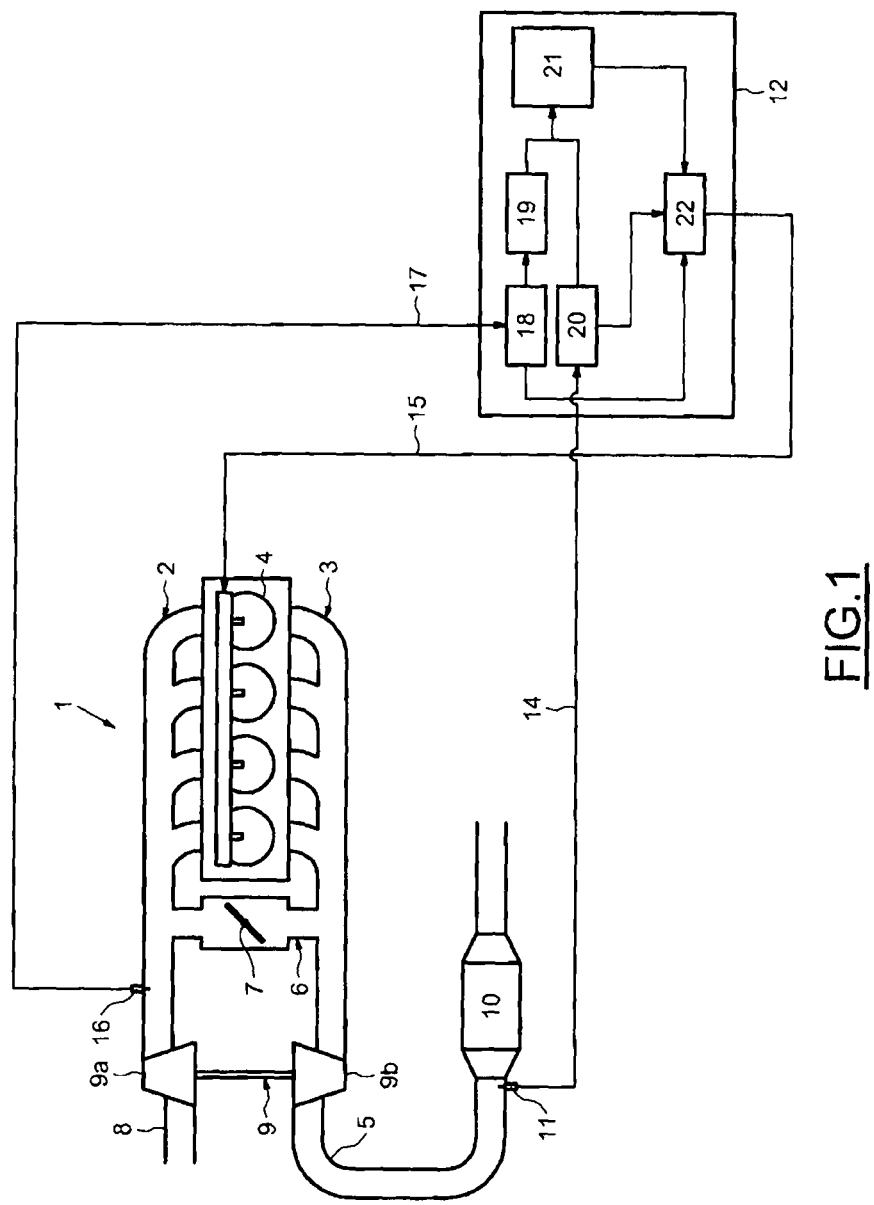
FIG. 1 illustrates an internal combustion engine provided with a first exhaust gas partial recirculation circuit and the main elements of a device for controlling injection according to the invention.

FIG. 1 shows an internal combustion engine 1 comprising an intake manifold 2, an exhaust manifold 3 which are linked to a set 4 of cylinders via valves which are not represented. The intake manifold 2 and the exhaust manifold 3 are linked to a turbocharger 9. More specifically, the intake manifold 2 is linked to the compressor 9a, the exhaust manifold 3 being linked to the turbine 9b. The compressor 9a is linked upstream to a fresh air intake pipe 8 whereas the turbine 9b is linked at its outlet to an exhaust pipe 5, including a catalytic converter 10 for treating the exhaust gases.

Moreover, the exhaust gas partial recirculation circuit 6 includes an exhaust gas partial recirculation valve 7 which is used to control the flow rate of the gases through the exhaust gas partial recirculation circuit and a partial recirculation pipe. The exhaust gas partial recirculation pipe is tapped between the exhaust manifold 3 and the turbine 9b and linked at its outlet between the intake manifold 2 and the compressor 9a. The exhaust gas partial recirculation circuit illustrated in FIG. 1 is, moreover, qualified as a high-pressure exhaust gas partial recirculation circuit because of its situation in a part of the drive train where the pressure is high through the action of the compressor 9a.

An electronic control unit 12 is linked to a first probe 11 positioned upstream of the catalytic converter 10 and downstream of the turbocharger 9 by a connection 14. The electronic control unit 12 is, moreover, connected to injector control means by a connection 15. The electronic control unit is also linked by a connection 17 to a second probe 16 situated between the turbocharger 9 and the exhaust gas partial recirculation circuit 6.

In order to take account of the unburned hydrocarbons brought by the exhaust gas partial recirculation circuit, it is necessary to differentiate a number of richnesses.

First to be defined is the injector richness $R_{inj}$ which corresponds to the ratio between the quantity of fuel injected and the quantity of fresh air taken in:

$$R_{inj} = K \cdot \frac{M_{ess}^{inj}}{M_{air}} \quad \text{(Eq. 1)}$$

with:

$M_{ess}^{inj}$ representing the mass of fuel injected $M_{air}$ representing the mass of fresh air obtained from the throttle valve K representing the air/petrol stoichiometric ratio.

$R_{comb}$ represents the richness measured by the first probe 11 placed on the exhaust pipe 5, that is to say, upstream of the catalytic converter 10.

$$R_{comb} = K \cdot \frac{M_{ess}^{inj} + M_{HC}^{EGR}}{M_{air}} \quad \text{(Eq. 2)}$$

with:

$M_{HC}^{EGR}$ representing the recirculated mass of unburned hydrocarbons.

The mass balance of the fuel introduced into the combustion chamber is as follows:

$$M_{ess} = M_{ess}^{inj} + M_{HC}^{EGR} = R_{comb} \cdot \frac{M_{air}}{K} \quad \text{(Eq. 3)}$$

with $M_{ess}^{EGR}$ representing the mass of fuel introduced into the combustion chamber through the exhaust gas partial recirculation circuit;

$M_{ess}$ represents the total mass of fuel in the combustion chamber.

Moreover, the following can be posited:

$$M_{ess}^{EGR} = M_{tot}^{EGR} - M_{GN}^{EGR} \quad \text{(Eq. 4)}$$

with:

$M_{tot}^{EGR}$ representing the total mass of air re-injected by the exhaust gas partial recirculation circuit $M_{GN}^{EGR}$ representing the mass of neutral gases re-injected by the exhaust gas partial recirculation circuit.

By combining equations 3 and 4, the following is obtained:

$$M_{ess}^{inj} + M_{tot}^{EGR} - M_{GN}^{EGR} = R_{comb} \cdot \frac{M_{air}}{K} \quad \text{(Eq. 5)}$$

The total mass of air taken in $M_{admis}$ is defined as the sum of the mass of fresh air taken in $M_{air}$ and the total mass of air re-injected by the exhaust gas partial recirculation circuit $M_{tot}^{EGR}$.

$$M_{admis} = M_{tot}^{EGR} + M_{air} \quad \text{(Eq. 6)}$$

The equation 5 is then divided by the expression of the total mass of air taken in $M_{admis}$ established on the basis of the mass balance of the air taken in (Eq. 6).

$$\frac{M_{ess}^{inj}}{M_{admis}} + \frac{M_{tot}^{EGR} - M_{GN}^{EGR}}{M_{admis}} = \frac{R_{comb}}{M_{admis}} \cdot \frac{M_{air}}{K} \quad \text{(Eq. 7)}$$

Moreover, the proportion of neutral gases $\tau_{GN}$ can be defined:

$$\tau_{GN} = \frac{M_{GN}^{EGR}}{M_{admis}} \quad \text{(Eq. 8)}$$

By combining equations 4, 6 and 8, the proportion of neutral gases can be rewritten as follows:

$$\tau_{GN} = \frac{M_{GN}^{EGR}}{M_{air} + M_{ess}^{EGR} + M_{GN}^{EGR}} \quad \text{(Eq. 9)}$$

A partial recirculation rate of the exhaust gases $\tau_{EGR}$ can also be defined by the following formula:

$$\tau_{EGR} = \frac{M_{tot}^{EGR}}{M_{admis}} \quad \text{(Eq. 10)}$$

By combining equations 6 and 10, the partial recirculation rate of the exhaust gases can be rewritten as follows:

$$1 - \tau_{EGR} = \frac{M_{air}}{M_{admis}} \quad \text{(Eq. 11)}$$

The richness $R_{inj}$ can then be expressed as a function of the exhaust gas partial recirculation rate and the proportion of neutral gases. By combining equations 1, 2 and 4, the following is obtained:

$$R_{inj} = R_{comb} + K \cdot \frac{(\tau_{GN} - \tau_{EGR})}{(1 - \tau_{EGR})} \quad \text{(Eq. 12)}$$

Similarly, the combustion richness $R_{comb}$ can be expressed as a function of the exhaust gas partial recirculation rate. If equations 2, 6 and 10 are combined, the following is obtained:

$$R_{comb} = \frac{R_{inj} - \tau_{EGR}}{1 - \tau_{EGR}} \quad \text{(Eq. 13)}$$

Equation 13 can be rewritten as follows:

$$R_{inj} = (1 - \tau_{EGR}) \cdot R_{comb} + \tau_{EGR} \quad \text{(Eq. 14)}$$

If equations 12 and 14 are combined, the following second degree equation is obtained:

$$\tau_{EGR}^2 \cdot (R_{comb} - 1) + \tau_{EGR} \cdot (1 + K - R_{comb}) + K \cdot \tau_{GN} = 0 \quad \text{(Eq. 15)}$$

The single positive solution of equation 15 is the following exhaust gas partial recirculation rate equation:

$$\tau_{EGR} = \frac{-(1 + K - R_{comb}) + \sqrt{(1 + K - R_{comb})^2 + 4 \cdot K \cdot \tau_{GN} \cdot (R_{comb} - 1)}}{2 \cdot (R_{comb} - 1)} \quad \text{(Eq. 16)}$$

By combining equations 1 and 14, the expression of the corrected fuel flow rate to be applied is obtained, in order to take into account the presence of the exhaust gas partial recirculation circuit:

$$M_{ess}^{inj} = \frac{R_{inj} \cdot M_{air}}{K} = \frac{M_{air}}{K} \cdot ((1 - \tau_{EGR}) \cdot R_{comb} + \tau_{EGR}) \quad \text{(Eq. 17)}$$

The electronic control unit applies the equation 17 to the value of the combustion richness $R_{comb}$, determined by the first probe 11, and to the value of the mass of fresh air $M_{air}$ taken into the intake manifold determined by the second probe 16 in order to determine the quantity of fuel to be injected $M_{ess}^{inj}$.

More specifically, the electronic control unit 12 comprises a means 20 for estimating the quantity of unburned fuel in the exhaust gases, a means 18 for estimating the quantity of fresh air taken into the internal combustion engine, a means 19 for estimating the proportion of neutral gases in the exhaust gases, a means 21 for estimating the proportion of recirculated gases and a means 22 for determining the quantity of fuel to be injected.

The means 18 for estimating the quantity of fresh air is linked at its inlet to the second probe 16 by the connection 17, and is linked at its outlet to the means 19 for estimating the proportion of neutral gases.

The means 20 for estimating the quantity of unburned fuel is linked at its inlet to the first probe 11 by the connection 14 and at its outlet to the means 21 for estimating the proportion of recirculated gases and to the means 22 for determining the quantity of fuel to be injected.

The means 19 for estimating the proportion of neutral gases in the exhaust gases is linked at its outlet to the means 21 for estimating the proportion of recirculated gases, which is in turn linked to the means 22 for determining the quantity of fuel to be injected. The means 22 for determining the quantity of fuel to be injected is connected at its outlet to the injector control means, not represented in FIGS. 1 and 2, by the connection 15.

Figure 2:
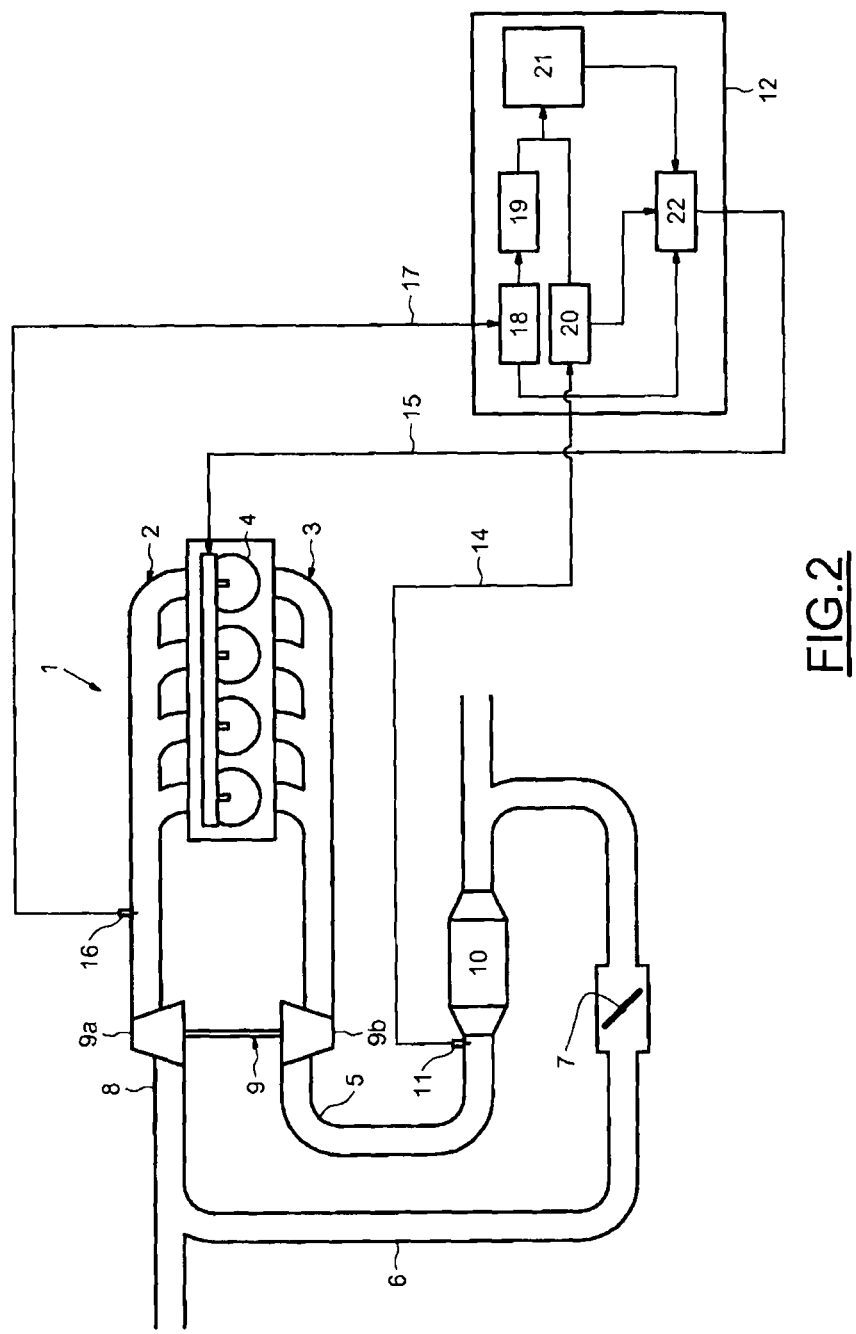
FIG. 2 illustrates an internal combustion engine provided with a second exhaust gas partial recirculation circuit and the main elements of a device for controlling injection according to the invention.

According to another embodiment, illustrated by FIG. 2, the exhaust gas partial recirculation circuit 6 may be of low-pressure type. In other words, the exhaust gas partial recirculation pipe is tapped at the outlet of the catalytic converter 10 and linked upstream of the compressor 9a to the fresh air intake pipe 8. Thus, all of the exhaust gas partial recirculation circuit is situated in a part of the drive train having a pressure lower than the pressure prevailing between the compressor 9a and the turbine 9b.

The electronic control unit 12 determines the quantity of fuel to be injected in a way similar to the determination described in the context of the first embodiment. However, the estimation of the quantity of fuel recirculated via the exhaust gas partial recirculation circuit 6 is modified to take into account the catalytic filter effect which degrades the unburned hydrocarbons. For this, either a determination of the oxygen storage capacity (OSC) of the catalytic converter, or a stored value of the effectiveness of the catalytic converter regarding the catalysis of the hydrocarbons is used. The value of the combustion richness measured by the first probe 11 is thus modulated to take into account the reduction in the quantity of hydrocarbons in the exhaust gases at the outlet of the catalytic converter and at the inlet of the exhaust gas partial recirculation circuit 6.

Figure 3:
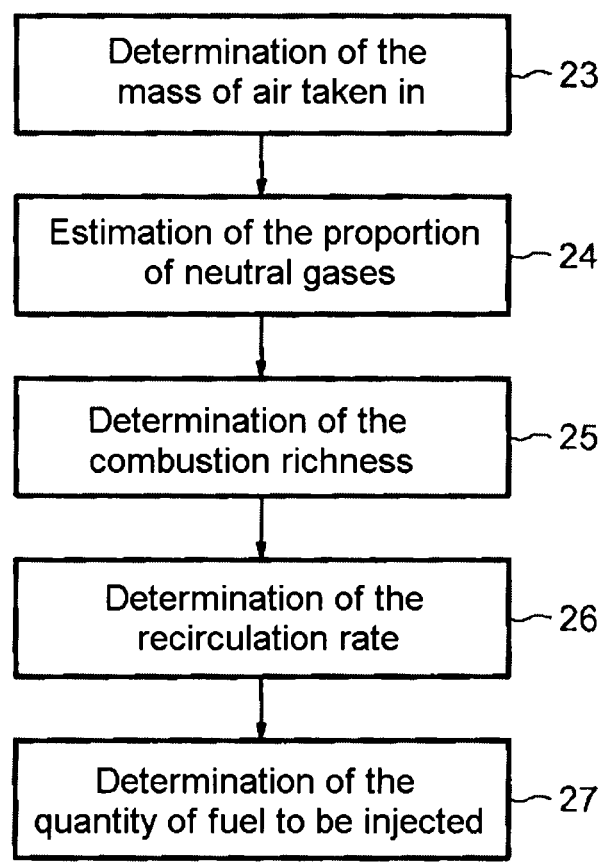
FIG. 3 illustrates the main steps of a method for controlling the quantity of fuel to be injected, according to the invention.

The control method is illustrated in FIG. 3. The method begins with a step 23 for estimating the mass of fresh air taken in $M_{air}$. This mass is determined on the basis of the signal received from the second probe 16.

The method continues with a step 24 for estimating the proportion of neutral gases $\tau_{GN}$. The equation 9 is used to determine $\tau_{GN}$ on the basis of the variables previously determined or measured.

In the step 25, the combustion richness $R_{comb}$ is determined. The combustion richness is determined on the basis of the signal received from the first probe 11.

The following step 26 is used to determine the exhaust gas partial recirculation rate $\tau_{EGR}$. The equation 16 is used to determine $\tau_{EGR}$ on the basis of the variables previously determined or measured.

The method ends at the step 27 during which the quantity of fuel to be injected is determined. For this, the equation 17 is solved on the basis of the variables previously determined or measured.

The device and the method for controlling injection which have been described can be used to accurately determine a strictly necessary quantity of fuel to be injected into an internal combustion engine in order to obtain a gas mixture taken into the engine that has the desired richness. Since this richness can vary depending on the operating phase of the engine, the invention is capable of determining the injection parameters in real time in order to instantaneously reflect these changes of operation and in order to retain optimum operation. It should be noted that the control device works equally well with low-pressure and high-pressure exhaust gas partial recirculation circuits, at the price of a few arrangements of the method making it possible to take account of the positioning of the exhaust gas partial recirculation circuit.

The control device and method are also capable of determining the quantity of neutral gases present in the exhaust gases in order to optimally adjust the quantities of fuel and fresh air taken in. An accurate control of the richness of the mixture taken in is thus possible.

The invention claimed is:

1. A device for controlling fuel injection in an internal combustion engine of an automotive vehicle, the internal combustion engine being linked at its inlet to a fresh air intake pipe and at its outlet to an exhaust gas exhaust pipe including a catalytic converter, an exhaust gas partial recirculation circuit tapped at an outlet of the catalytic converter linking the exhaust pipe to the fresh air intake pipe, the device comprising:
    means for determining a quantity of unburned fuel in exhaust gases upstream of the catalytic converter;
    means for determining a quantity of fresh air taken into the internal combustion engine, including means for estimating a mass of fresh air taken in;
    means for estimating a proportion of inert gases in the exhaust gases based on signals received from the means for estimating the mass of fresh air taken in; and
    electronic control means for determining a quantity of fuel to be injected based on signals received from the means for determining the quantity of unburned fuel in the exhaust gases upstream of the catalytic converter, from the means for estimating the mass of fresh air taken in, and from the means for estimating the proportion of inert gases in the exhaust gases.

2. The control device as claimed in claim 1, in which the means for determining the quantity of unburned fuel comprises a first probe situated upstream of the catalytic converter and means for estimating the quantity of unburned fuel in the exhaust gases based on signals received from the first probe.

3. The control device as claimed in claim 1, in which the means for determining the quantity of fresh air taken into the internal combustion engine comprises a second probe situated upstream of a tapping point of the exhaust gas partial recirculation circuit on the fresh air intake pipe and the means for estimating the mass of fresh air taken in based on signals received from the second probe.

4. The control device as claimed in claim 1, further comprising:
    an intake manifold;
    an exhaust manifold; and
    a turbocharger comprising a compressor and a turbine, the compressor being positioned between the fresh air intake pipe and the intake manifold, the turbine being positioned between the exhaust pipe and the exhaust manifold,
    the exhaust gas partial recirculation circuit comprising a controlled valve and a partial recirculation pipe linked on between the exhaust manifold and the turbine and between the intake manifold and the compressor.

5. The control device as claimed in claim 1, further comprising:
    an intake manifold;
    an exhaust manifold; and
    a turbocharger comprising a compressor and a turbine, the compressor being positioned between the fresh air intake pipe and the intake manifold, the turbine being positioned between the exhaust pipe and the exhaust manifold,
    the exhaust gas partial recirculation circuit comprising a controlled valve and a partial recirculation pipe linked on to the outlet of the catalytic converter and upstream of the compressor.

6. A method for controlling fuel injection in an internal combustion engine of an automotive vehicle, the internal combustion engine being linked at its inlet to a fresh air intake pipe and at its outlet to an exhaust gas exhaust pipe, which is in turn linked to a catalytic converter, an exhaust gas partial recirculation circuit tapped at an outlet of the catalytic converter linking the exhaust pipe to the fresh air intake pipe, the method comprising:
    determining a quantity of unburned fuel in the exhaust gases upstream of the catalytic converter;
    determining a quantity of fresh air taken into the internal combustion engine via the fresh air intake pipe;
    estimating a proportion of inert gases in the exhaust gases based on a mass of fresh air taken in; and
    determining a quantity of fuel to be injected based on the quantity of unburned fuel in the exhaust gases upstream of the catalytic converter, the mass of fresh air taken in, and the proportion of inert gases in the exhaust gases.

7. A device for controlling fuel injection in an internal combustion engine of an automotive vehicle, the internal combustion engine being linked at its inlet to a fresh air intake pipe and at its outlet to an exhaust gas exhaust pipe including a catalytic converter, an exhaust gas partial recirculation circuit tapped at an outlet of the catalytic converter linking the exhaust pipe to the fresh air intake pipe, the device comprising:
    an electronic control unit configured to
        determine a quantity of unburned fuel in exhaust gases upstream of the catalytic converter,
        determine a quantity of fresh air taken into the internal combustion engine,
        estimate a mass of fresh air taken in,
        estimate a proportion of inert gases in the exhaust gases based on the estimated mass of fresh air taken in; and
        determine a quantity of fuel to be injected based on the determined quantity of unburned fuel in the exhaust gases upstream of the catalytic converter, the estimated mass of fresh air taken in, and estimated proportion of inert gases in the exhaust gases.

* * * * *